(12) United States Patent
Chiu et al.

(10) Patent No.: US 11,808,938 B2
(45) Date of Patent: Nov. 7, 2023

(54) APPARATUS FOR MEASURING OPTICAL CHARACTERISTICS OF A TEST OPTICAL ELEMENT UNDER LOW-TEMPERATURE ENVIRONMENT

(71) Applicant: YOUNG OPTICS INC., Hsinchu Science Park (TW)

(72) Inventors: Wei-Ting Chiu, Hsinchu Science Park (TW); Chu-Tsung Chan, Hsinchu Science Park (TW); Sandeep Kumar Paral, Hsinchu Science Park (TW); Chia-Chang Lee, Hsinchu Science Park (TW)

(73) Assignee: YOUNG OPTICS INC., Hsinchu Science Park (TW)

( * ) Notice: Subject to any disclaimer, the term of this patent is extended or adjusted under 35 U.S.C. 154(b) by 96 days.

(21) Appl. No.: 17/334,023

(22) Filed: May 28, 2021

(65) Prior Publication Data
US 2021/0382301 A1 Dec. 9, 2021

(30) Foreign Application Priority Data
Jun. 5, 2020 (TW) .................................. 109118932

(51) Int. Cl.
*G02B 27/00* (2006.01)
*G01J 1/02* (2006.01)
*G02B 7/02* (2021.01)
*G01M 11/02* (2006.01)

(52) U.S. Cl.
CPC ........ *G02B 27/0006* (2013.01); *G01J 1/0252* (2013.01); *G01M 11/02* (2013.01); *G01M 11/0207* (2013.01); *G01M 11/0264* (2013.01); *G02B 7/028* (2013.01)

(58) Field of Classification Search
CPC ... G02B 27/0006; G02B 7/028; G01J 1/0252; G01M 11/02; G01M 11/0207; G01M 11/0264
See application file for complete search history.

(56) References Cited

U.S. PATENT DOCUMENTS

| | | | |
|---|---|---|---|
| 2016/0161616 A1* | 6/2016 | Nakayama | G01T 1/244 250/370.15 |
| 2019/0384146 A1* | 12/2019 | Dong | G02B 7/028 |
| 2020/0025608 A1* | 1/2020 | Kramer | G01J 1/4257 |
| 2020/0132541 A1* | 4/2020 | Su | G01B 11/24 |
| 2020/0224488 A1* | 7/2020 | Park | H04N 1/00992 |
| 2022/0187161 A1* | 6/2022 | Antoine | G01N 21/455 |

* cited by examiner

*Primary Examiner* — Jennifer D Bennett
*Assistant Examiner* — Erin R Garber
(74) *Attorney, Agent, or Firm* — Muncy, Geissler, Olds & Lowe

(57) ABSTRACT

An optical measurement apparatus includes a thermal insulation housing, a first light-transmissive plate, a second light-transmissive plate, a heat-conductive layer, a cooling source and a photosensor. The thermal insulation housing, the first light-transmissive plate and the second light-transmissive plate define a chamber. The heat-conductive layer is disposed in the chamber, the cooling source is coupled to the heat-conductive layer, and the photosensor is disposed outside the chamber and on one side of the second light-transmissive plate facing away from the first light-transmissive plate.

20 Claims, 4 Drawing Sheets

APPARATUS FOR MEASURING OPTICAL CHARACTERISTICS OF A TEST OPTICAL ELEMENT UNDER LOW-TEMPERATURE ENVIRONMENT

BACKGROUND OF THE INVENTION a. Field of the Invention

The invention relates to an optical measurement apparatus.

b. Description of the Related Art

Nowadays, the degree to which the performance of an optical lens is affected under a low-temperature environment simulating extreme climatic conditions can be measured by modern technologies. However, a test station with built-in cooling and temperature control functions for measuring optical characteristics is very expensive. Moreover, an alternate method of using a coolant to lower the temperature not only fails to control the temperature, but also takes a very long time to obtain the expected low-temperature condition that only lasts for a limited period of time. Therefore, it would be desirable to provide an optical measurement apparatus having simplified construction, low fabrication costs, and adjustable temperature controls.

The information disclosed in this "BACKGROUND OF THE INVENTION" section is only for enhancement understanding of the background of the invention and therefore it may contain information that does not form the prior art already known to a person of ordinary skill in the art. Furthermore, the information disclosed in this "BACKGROUND OF THE INVENTION" section does not mean that one or more problems to be solved by one or more embodiments of the invention is acknowledged by a person of ordinary skill in the art.

BRIEF SUMMARY OF THE INVENTION

According to one aspect of the present disclosure, an optical measurement apparatus includes a thermal insulation housing, a first light-transmissive plate, a second light-transmissive plate, a heat-conductive layer, a cooling source and a photosensor. The thermal insulation housing is provided with a first opening and a second opening opposite the first opening, the first light-transmissive plate is disposed at the first opening, and the second light-transmissive plate is disposed at the second opening. The thermal insulation housing, the first light-transmissive plate and the second light-transmissive plate define a chamber. The heat-conductive layer is disposed in the chamber, the cooling source is coupled to the heat-conductive layer, and the photosensor is disposed outside the chamber and on one side of the second light-transmissive plate facing away from the first light-transmissive plate.

According to another aspect of the present disclosure, an optical measurement apparatus includes a pattern light generation unit, a chamber, a heat-conductive layer, a cooling source and a photosensor. The pattern light generation unit provides a pattern beam, and the chamber accommodates a test optical element placed in a light path of the pattern beam. The heat-conductive layer is disposed in the chamber, and the cooling source is coupled to the heat-conductive layer. The photosensor is disposed outside the chamber and downstream from the chamber in the light path of the pattern beam, and the pattern beam is focused to form an image on the photosensor.

In accordance with the above aspects, the cooling source cooperating with the thermal insulation chamber may achieve a stable low-temperature environment (such as −20° C. or below) at reduced fabrications costs and by a simplified construction. Besides, the temperature of the low-temperature environment can be accurately controlled simply by adjusting the magnitude of electric currents. Further, the defogging design is allowed to clear condensation and thaw frost formed in the low-temperature environment to permit accurate and stable optical measurements. Moreover, because the photosensor is disposed outside the chamber of the optical measurement apparatus, the photosensor would not be adversely affected by the temperature of the chamber to further improve the measurement accuracy.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc., as used herein, are used as labels for nouns that they precede, and do not imply any type of ordering (e.g., spatial, temporal, logical, etc.).

Figure 1:
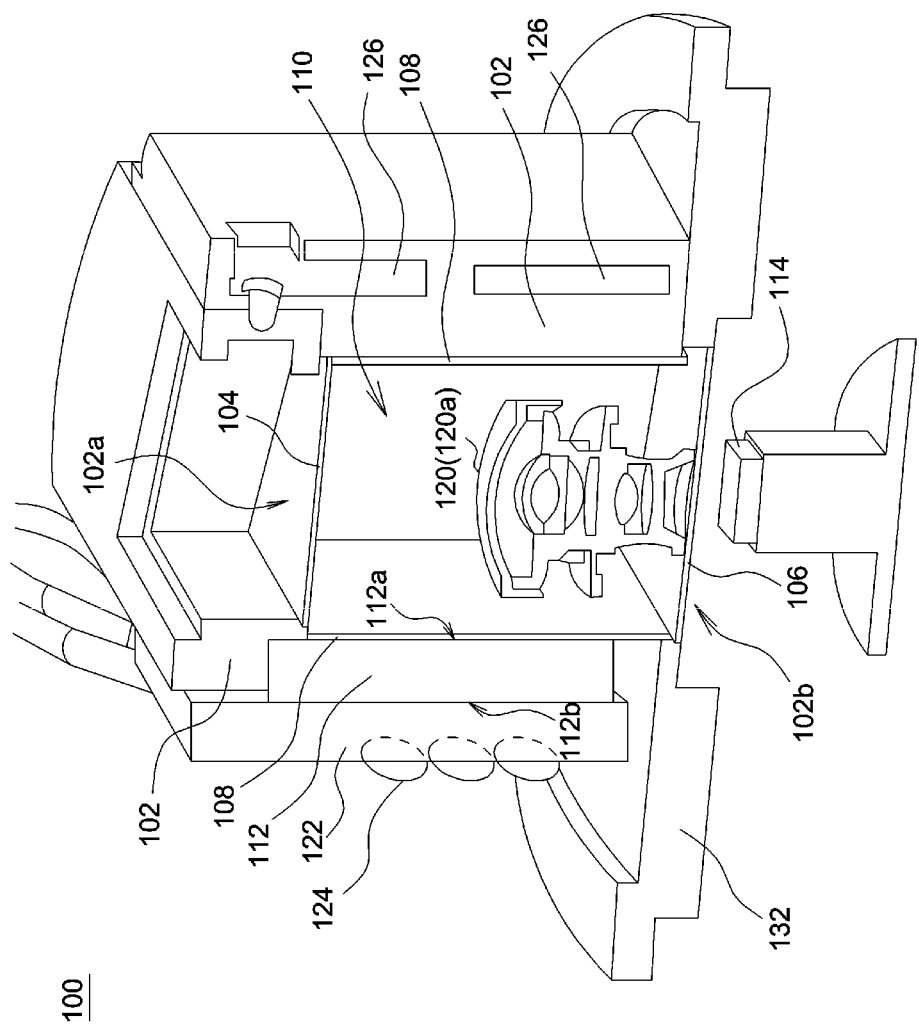
FIG. 1 and FIG. 2 respectively show a perspective view and a schematic plan view of an optical measurement apparatus according to an embodiment of the invention.
Figure 2:
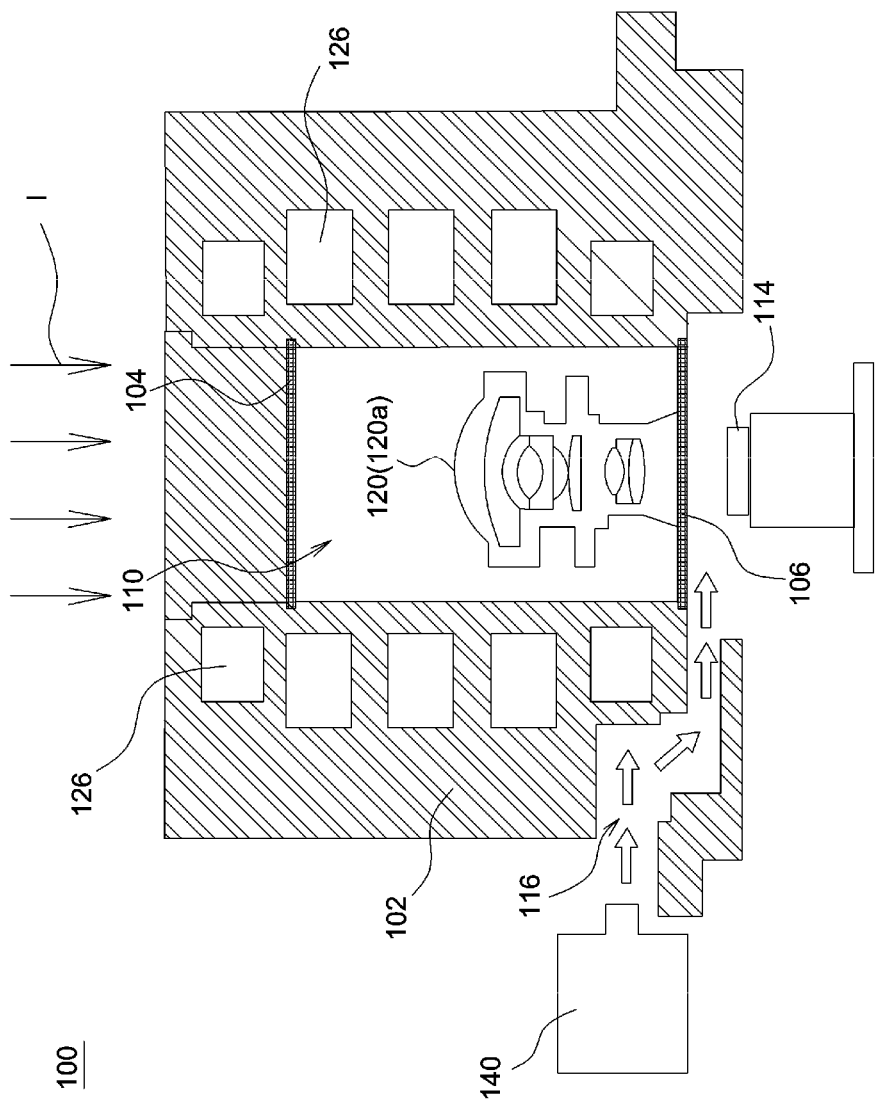

FIG. 1 and FIG. 2 respectively show a perspective view and a schematic plan view of an optical measurement apparatus according to an embodiment of the invention, where a defogging unit and a fluid-guiding structure for the optical measurement apparatus are additionally depicted in FIG. 2. As shown in FIG. 1, the optical measurement apparatus 100 may include a thermal insulation housing 102, a first light-transmissive plate 104, a second light-transmissive plate 106, a heat-conductive layer 108, a thermoelectric cooling chip 112 and a photosensor 114. The thermal insulation housing 102 is provided with a first opening 102a and a second opening 102b, the first light-transmissive plate 104 is disposed at the first opening 102a, the second light-transmissive plate 106 is disposed at the second opening 102b, and the thermal insulation housing 102, the first light-transmissive plate 104 and the second light-transmissive plate 106 may define a chamber 110 for accommodating at least one test optical element 120. The first light-transmissive plate 104 and the second light-transmissive plate 106 are fixed on the thermal insulation housing 102 by, for example, airtight sealing. In this embodiment, the test optical element 120 is, for example, an optical lens 120*a* includes multiple lenses with refractive powers. In other embodiment, the test optical element may be a singlet lens or other optics without limitation. The heat-conductive layer 108 such as a copper sheet is disposed on an inner wall of the chamber 110, and a thermoelectric cooling chip 112 is coupled to the heat-conductive layer 108. The thermoelectric cooling chip 112 during operation defines a cold side 112*a* and a hot side 112*b*. In this embodiment, the cold side 112*a* touches the heat-conductive layer 108, and the hot side 112*b* touches a heat-dissipating element such a heat-dissipating fin 122 and/or a heat pipe 124. The thermal insulation housing 102 may serve as a case or a cover and is entirely disposed on a holder 132 of a test station, and multiple insulation air cavities 126 are provided inside the thermal insulation housing 102. The thermoelectric cooling chip 112 may serve as a cooling source to cool the chamber 110 to an expected low temperature. The insulation air cavities 126 surrounding the chamber 110 may reduce heat exchange between the chamber 110 and the outside environment to allow the test optical element 120 to continually maintain the low temperature required for test operations. For example, according to the above embodiment, the chamber 110 is allowed to continually maintain a temperature of −20° C. or below. Therefore, the degree to which the performance of the optical lens 120*a* is affected under a low-temperature environment simulating extreme climatic conditions can be measured.

Figure 3:
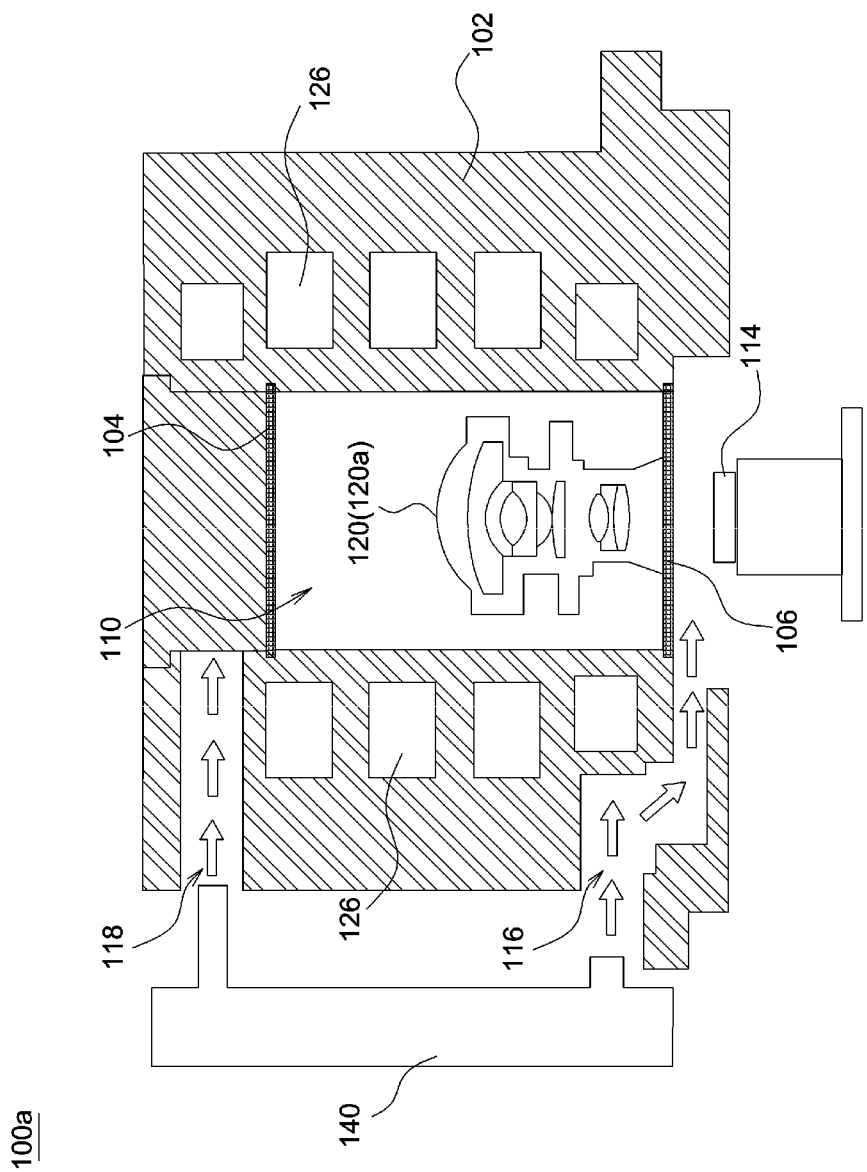
FIG. 3 shows a schematic plan view of an optical measurement apparatus according to another embodiment of the invention.

As shown in FIG. 2, a light beam I used for optical measurement may pass through the first light-transmissive plate 104, the test optical element 120 inside the chamber 110, and the second light-transmissive plate 106 in succession, and then the optical lens 120*a* focuses the light beam I and forms an image on the photosensor 114 outside the chamber 110. In this embodiment, the photosensor 114 outside the chamber 110 is disposed on one side of the second light-transmissive plate 106 facing away from the first light-transmissive plate 104. When the low-temperature measurement is performed by the optical measurement apparatus 100 under a temperature of −20° C. or below, the chamber 110 is kept at an extremely low temperature while the outside environment maintains a room temperature. Under the circumstance, the moisture in air is liable to condense on and fog the second light-transmissive plate 106, thus adversely affecting the light transmission to cause measurement errors or failure to perform the test. In this embodiment, as shown in FIG. 2, a defogging unit 140 is provided to transport a dry gas into a region between the chamber 110 and the photosensor 114, and a fluid-guiding structure 116 such as an air channel is provided between the defogging unit 140 and the second light-transmissive plate 106. In this embodiment, the fluid-guiding structure 116 is in fluid communication with the defogging unit 140 and a region between the chamber 110 and the photosensor 114, and the fluid-guiding structure 116 is disposed inside the thermal insulation housing 102 and has an opening facing the second light-transmissive plate 106. The defogging unit 140 may be an air dryer and may supply a dry gas (such as air) with a humidity of lower than 50%. Dry gas is continually blown by the defogging unit 140 and then ducted by the fluid-guiding structure 116 to distribute over the surface of the second light-transmissive plate 106 for dehumidification, thereby avoiding a fogged or frosted light-transmissive plate 106 to achieve more accurate and stable optical measurements. The defogging unit 140 is only used to defog or defrost the light-transmissive plate and not limited to a specific structure or shape. In other embodiment, the defogging unit 140 may include electric heating wires instead of the fluid-guiding structure 116. Further, in this embodiment, the defogging unit 140 defogs or defrosts the second light-transmissive plate 106 by the fluid-guiding structure 116 disposed on the bottom side of the thermal insulation housing 102, but the invention is not limited thereto. In an alternate embodiment shown in FIG. 3, the defogging unit 140 of an optical measurement apparatus 100*a* may also defog or defrost the top first light-transmissive plate 104 if desired, and a fluid-guiding structure 118 may be disposed on a top side of the thermal insulation housing 102 where the first light-transmissive plate 104 is provided.

Figure 4:
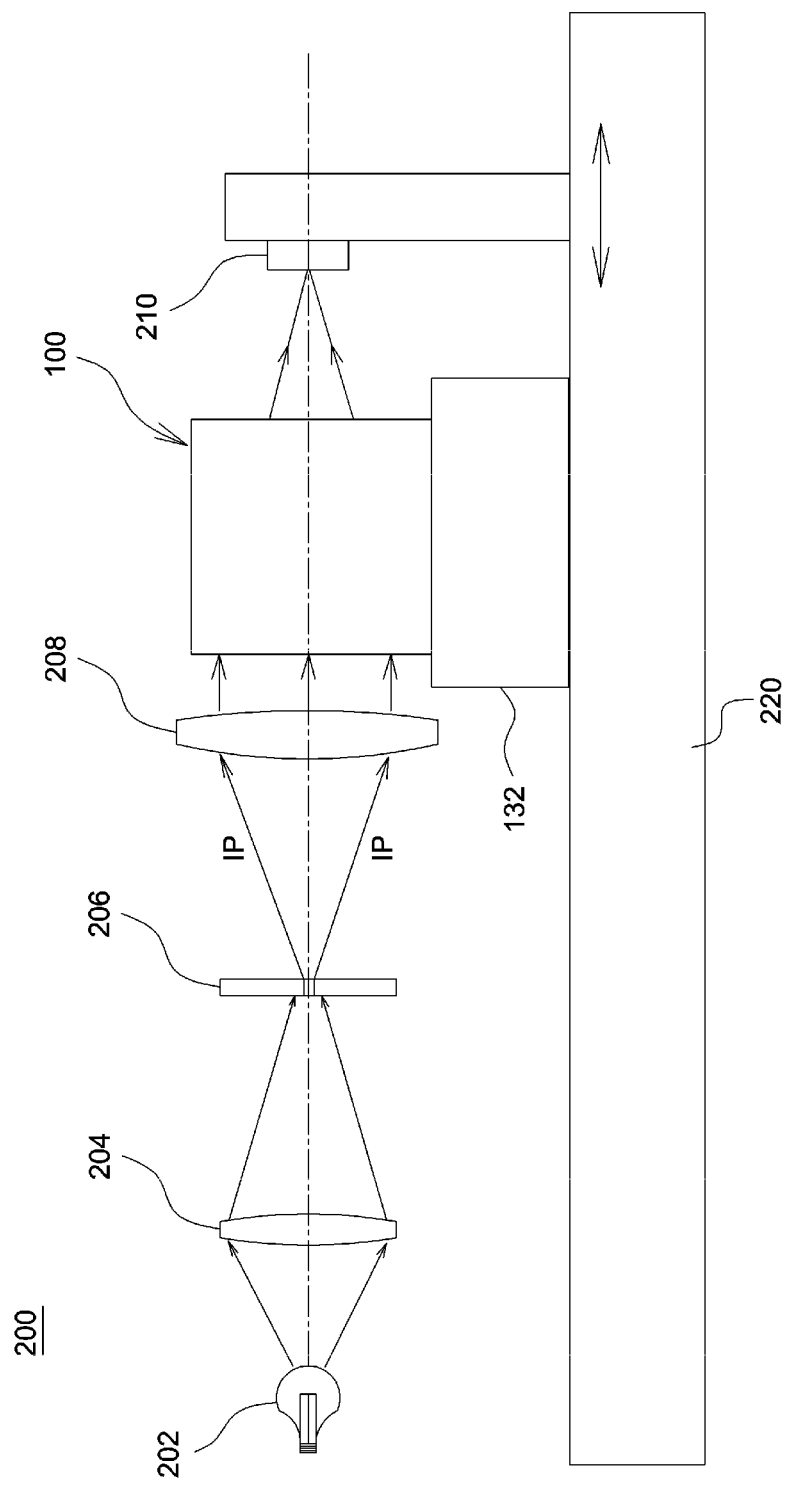
FIG. 4 shows a schematic diagram of an optical measurement apparatus used in an MTF test station for measuring the optical performance of an optical lens in accordance with an embodiment of the invention.

FIG. 4 shows a schematic diagram of an optical measurement apparatus used in an MTF test station for measuring the optical performance of an optical lens in accordance with an embodiment of the invention. As shown in FIG. 4, in the MTF test station 200, a light source 202, a converging lens 204 and a stop 206 form a pattern light generation unit. Emitting light of the light source 202 is focused on the stop 206 with a slit by the converging lens 204 to form a pattern beam IP. The pattern beam IP is collimated by a light collimator such as a collimator lens 208, and the collimated pattern beam IP enters the optical measurement apparatus 100 and forms an image on the photosensor 210. The optical measurement apparatus 100 is disposed on a holder 132 of the test station 200, and the holder 132 and the photosensor 210 are disposed on a carrier 220. Further, the photosensor 210 may move in the axial direction of the carrier 220 to realize accurate focusing. The image data from the photosensor 210 are subject to subsequent signal processing to obtain the values of modulation transfer function (MTF). The MTF values can be used in quantitative analysis of the overall image quality or contrast of an optical system and thus serve as a criterion for judging the performance of the optical system. In the above embodiment, the optical measurement apparatus is exemplified to measure the MTF values of an optical lens, but the invention is not limited thereto. The optical measurement apparatus may measure other imaging characteristic, criterion or parameters without limitation. Besides, the above embodiment that uses a thermoelectric cooling chip to generate the low-temperature environment is merely an example, and other cooling source such as a cryogenic pump or cold traps may be used without limitation. In other embodiment, a thermoelectric chip or other heater may be used to generate a high-temperature environment, and the optical measurement apparatus in accordance with the above embodiments may measure the degree to which the performance of the optical lens is affected under the high-temperature environment simulating extreme climatic conditions.

According to the above embodiments, the cooling source cooperating with the thermal insulation chamber may achieve a stable low-temperature environment (such as −20° C. or below) at reduced fabrications costs and by a simplified construction. Besides, the temperature of the low-temperature environment can be accurately controlled simply by adjusting the magnitude of electric currents. Further, the defogging design is allowed to clear condensation and thaw frost formed in the low-temperature environment to permit accurate and stable optical measurements. Moreover, because the photosensor is disposed outside the chamber of the optical measurement apparatus, the photosensor would not be adversely affected by the temperature of the chamber to further improve the measurement accuracy.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. It is intended that the scope of the invention be defined by the claims appended hereto and their equivalents in which all terms are meant in their broadest reasonable sense unless otherwise indicated.

What is claimed is:

1. An optical measurement apparatus, comprising:
    a thermal insulation housing provided with a first opening and a second opening respectively communicating with spaces outside opposite sides of the thermal insulation housing;
    a first light-transmissive plate disposed at the first opening;
    a second light-transmissive plate disposed at the second opening, wherein the thermal insulation housing, the first light-transmissive plate and the second light-transmissive plate define a chamber;
    a heat-conductive layer disposed in the chamber;
    a cooling source coupled to the heat-conductive layer; and
    a photosensor disposed outside the chamber and on one side of the second light-transmissive plate facing away from the first light-transmissive plate.

2. The optical measurement apparatus as claimed in claim 1, wherein the cooling source is a thermoelectric cooling chip provided with a cold side and a hot side, the cold side touches the heat-conductive layer, and the hot side touches a heat-dissipating element.

3. The optical measurement apparatus as claimed in claim 2, wherein the heat-dissipating element includes at least one of a heat pipe and a heat-dissipating fin, and the heat-conductive layer is a copper sheet.

4. The optical measurement apparatus as claimed in claim 1, further comprising:
    a defogging unit for defogging or defrosting at least the second light-transmissive plate.

5. The optical measurement apparatus as claimed in claim 4, further comprising:
    a first fluid-guiding structure disposed between the defogging unit and the second light-transmissive plate.

6. The optical measurement apparatus as claimed in claim 5, wherein the first fluid-guiding structure is disposed inside the thermal insulation housing and has an opening facing the second light-transmissive plate.

7. The optical measurement apparatus as claimed in claim 5, further comprising:
    a second fluid-guiding structure disposed between the defogging unit and the first light-transmissive plate.

8. The optical measurement apparatus as claimed in claim 4, wherein the defogging unit is an air dryer, and the air dryer transports a dry gas into a region between the chamber and the photosensor.

9. The optical measurement apparatus as claimed in claim 4, wherein the defogging unit comprises electric heating wires.

10. The optical measurement apparatus as claimed in claim 1, further comprising:
    a plurality of insulation air cavities disposed inside the thermal insulation housing.

11. An optical measurement apparatus, comprising:
    a pattern light generation unit for providing a pattern beam;
    a chamber for accommodating a test optical element, wherein the test optical element is placed in a light path of the pattern beam;
    a heat-conductive layer disposed in the chamber;
    a cooling source coupled to the heat-conductive layer; and
    a photosensor disposed outside the chamber and downstream from the chamber in the light path of the pattern beam, wherein the pattern beam is focused to form an image on the photosensor.

12. The optical measurement apparatus as claimed in claim 11, further comprising: a light collimator disposed downstream from the pattern light generation unit for collimating the pattern beam.

13. The optical measurement apparatus as claimed in claim 11, wherein the cooling source is a thermoelectric cooling chip provided with a cold side and a hot side, the cold side touches the heat-conductive layer, and the hot side touches a heat-dissipating element.

14. The optical measurement apparatus as claimed in claim 13, wherein the heat-dissipating element includes at least one of a heat pipe and a heat-dissipating fin, and the heat-conductive layer is a copper sheet.

15. The optical measurement apparatus as claimed in claim 11, further comprising a thermal insulation housing, a first light-transmissive plate and a second light-transmissive plate for defining the chamber.

16. The optical measurement apparatus as claimed in claim 15, further comprising: a defogging unit for defogging or defrosting at least the second light-transmissive plate.

17. The optical measurement apparatus as claimed in claim 16, further comprising: a first fluid-guiding structure disposed between the defogging unit and the second light-transmissive plate.

18. The optical measurement apparatus as claimed in claim 16, wherein the defogging unit is an air dryer, and the air dryer transports a dry gas into a region between the chamber and the photosensor.

19. The optical measurement apparatus as claimed in claim 16, wherein the defogging unit comprises electric heating wires.

20. The optical measurement apparatus as claimed in claim 11, further comprising:
    a plurality of insulation air cavities disposed inside the thermal insulation housing.

* * * * *